United States Patent
Ryoki et al.

(10) Patent No.: US 12,028,623 B2
(45) Date of Patent: Jul. 2, 2024

(54) PHOTOELECTRIC CONVERSION APPARATUS, PHOTOELECTRIC CONVERSION SYSTEM, AND SEMICONDUCTOR SUBSTRATE

(71) Applicant: CANON KABUSHIKI KAISHA, Tokyo (JP)

(72) Inventors: Tatsuya Ryoki, Kanagawa (JP); Tetsuya Itano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 17/590,369

(22) Filed: Feb. 1, 2022

(65) Prior Publication Data
US 2022/0247921 A1 Aug. 4, 2022

(30) Foreign Application Priority Data
Feb. 4, 2021 (JP) ................. 2021-016455

(51) Int. Cl.
*H04N 23/80* (2023.01)
*H04N 23/60* (2023.01)

(52) U.S. Cl.
CPC ........... *H04N 23/80* (2023.01); *H04N 23/665* (2023.01)

(58) Field of Classification Search
CPC .... H04N 23/80; H04N 23/634; H04N 23/665; H04N 25/75; H04N 23/617
See application file for complete search history.

(56) References Cited

U.S. PATENT DOCUMENTS

| | | | | |
|---|---|---|---|---|
| 5,303,328 | A * | 4/1994 | Masui | G06N 3/04 706/19 |
| 5,440,924 | A * | 8/1995 | Itsuji | G01F 1/684 73/204.25 |
| 2018/0097960 | A1* | 4/2018 | Ochiai | H04N 1/00978 |
| 2018/0162301 | A1* | 6/2018 | Meng | G01S 19/13 |
| 2020/0076458 | A1* | 3/2020 | Knopik | H04B 1/0458 |
| 2022/0070349 | A1* | 3/2022 | Watanabe | H04N 23/665 |
| 2022/0385809 | A1* | 12/2022 | Kai | H04N 23/80 |
| 2023/0266109 | A1* | 8/2023 | Teowee | F42B 3/10 102/202.5 |

FOREIGN PATENT DOCUMENTS

JP 2020072410 A 5/2020

* cited by examiner

*Primary Examiner* — Hung H Lam
(74) *Attorney, Agent, or Firm* — Canon U.S.A., Inc. IP Division

(57) ABSTRACT

A photoelectric conversion apparatus includes a first substrate including a pixel array including a plurality of pixels, and a second substrate disposed in a multilayer structure on the first substrate. The photoelectric conversion apparatus further includes a machine learning unit configured to execute processing using machine learning on a signal output from the pixel array, and a signal output unit configured to output a signal corresponding to temperature. Both the machine learning unit and the signal output unit are disposed on the second substrate.

20 Claims, 13 Drawing Sheets

FIG. 11B
FRONT VIEW
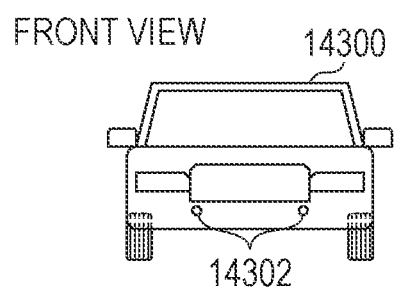
TOP VIEW
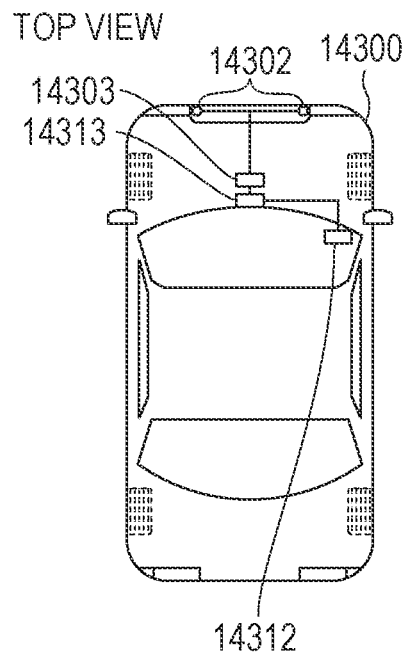
REAR VIEW
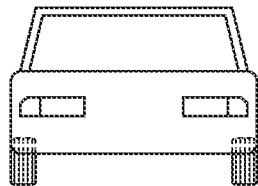

PHOTOELECTRIC CONVERSION APPARATUS, PHOTOELECTRIC CONVERSION SYSTEM, AND SEMICONDUCTOR SUBSTRATE

BACKGROUND

Field of the Disclosure

The present disclosure relates to a photoelectric conversion apparatus, a photoelectric conversion system, and a semiconductor substrate.

Description of the Related Art

In recent years, as disclosed in Japanese Patent Laid-Open No. 2020-072410, an image sensor has been proposed as a photoelectric conversion apparatus for acquiring a still image or a moving image, in which a sensor chip, a memory chip, a DSP (Digital Signal Processor) and the like are disposed in a multilayer structure.

More advanced processing using machine learning is needed to perform a wide variety of image processing at a higher speed. The operation of the machine learning may cause a large amount of heat generation to occur, which may cause a failure to occur in the operation of the photoelectric conversion apparatus.

SUMMARY

In an aspect, the present disclosure provides a photoelectric conversion apparatus including a first substrate including a pixel array including a plurality of pixels, and a second substrate disposed in a multilayer structure on the first substrate, the photoelectric conversion apparatus further including a machine learning unit configured to execute processing using machine learning on a signal output from the pixel array, and a signal output unit configured to output a signal corresponding to temperature, both the machine learning unit and the signal output unit being disposed on the second substrate.

In another aspect, the present disclosure provides a semiconductor substrate disposed in a multilayer structure on another semiconductor substrate having a pixel array including a plurality of pixels, the semiconductor substrate including a machine learning unit configured to execute processing using machine learning on a signal output from the pixel array, and a signal output unit configured to output a signal corresponding to temperate.

In still another aspect, the present disclosure provides a semiconductor substrate disposed in a multilayer structure on a semiconductor substrate having a pixel array including a plurality of pixels and a first signal output unit configured to output a signal corresponding to temperate, the semiconductor substrate including a machine learning unit configured to execute processing using machine learning on a signal output from the pixel array, and a second signal output unit.

Further features of the present invention will become apparent from the following description of exemplary embodiments with reference to the attached drawings.

BRIEF DESCRIPTION OF THE DRAWINGS

FIG. 11B is a diagram illustrating a mobile body according to the eighth embodiment.

DESCRIPTION OF THE EMBODIMENTS

Photoelectric conversion apparatuses according to various embodiments of the present disclosure are described below with reference to drawings.

In each of the embodiments described below, an imaging apparatus is mainly described as an example of a photoelectric conversion apparatus to which the present disclosure is applicable, but the application of each embodiment is not limited to the imaging apparatus. For example, each embodiment can be applied to other apparatuses such as a distance measurement apparatus (an apparatus for measuring a distance using a focus detection, TOF (Time Of Flight), or the like), a photometric apparatus (an apparatus for measuring the amount of incident light, etc.), and so on.

First Embodiment

A first embodiment is described below with reference to FIGS. 1 to 3.

Figure 1:
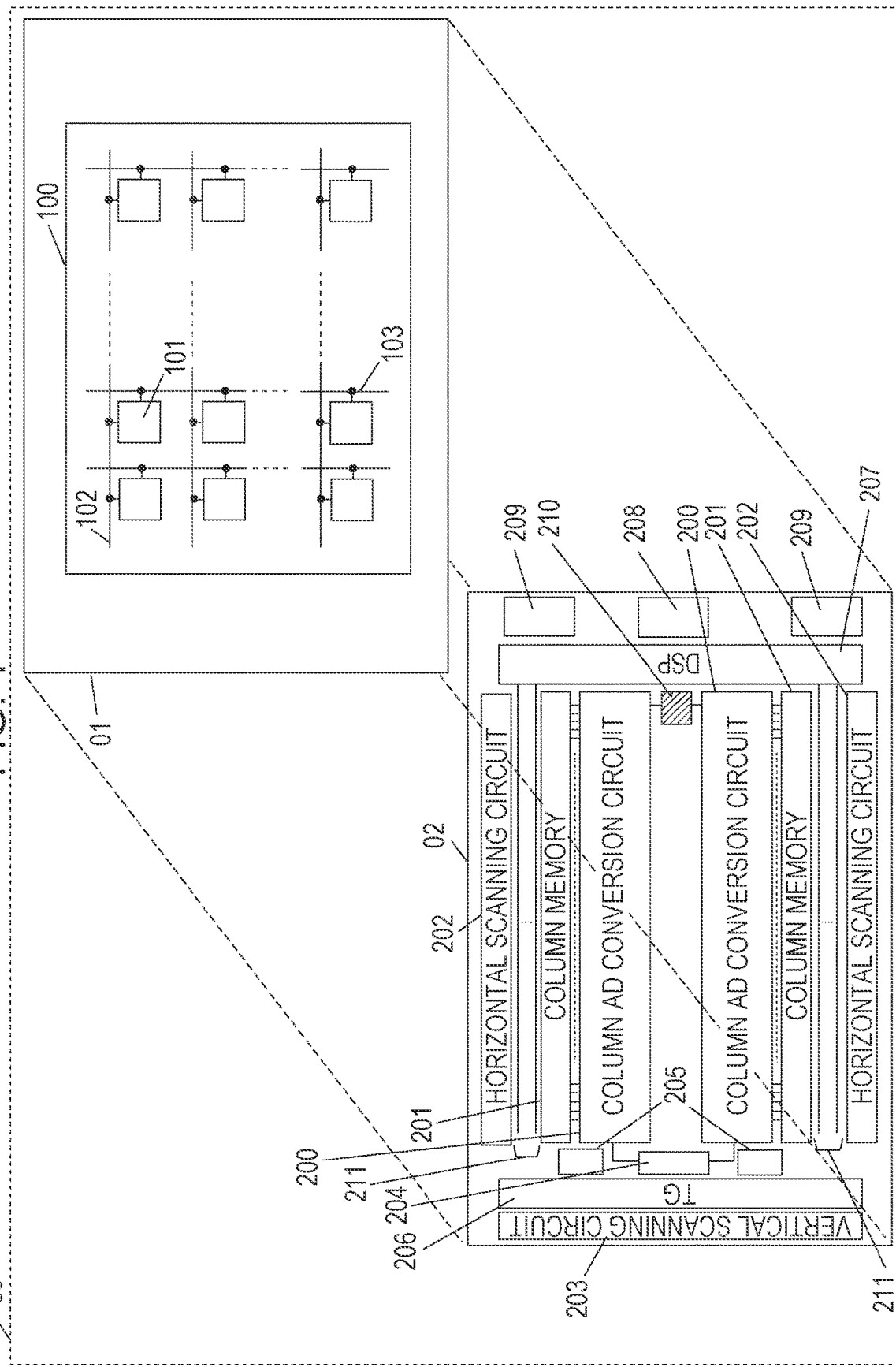
FIG. 1 is a schematic diagram illustrating a photoelectric conversion apparatus according to a first embodiment.

FIG. 1 is a schematic diagram illustrating a photoelectric conversion apparatus according to the first embodiment. The photoelectric conversion apparatus 00 according to the first embodiment includes a first substrate 01 and a second substrate 02.

The first substrate 01 and the second substrate 02 are bonded together. The bonding of the first substrate 01 and the second substrate 02 may be performed by a so-called CoC (Chip on Chip) method in which the first substrate 01 and the second substrate 02 are individually formed and then bonded together. A CoW (Chip on Wafer) method may be used to bond the first embodiment 01 and the second embodiment 02. In this method, one of the first substrate 01 and the second substrate 02 is divided into chips, and then the chips are bonded to the other substrate. In a case where a WoW (Wafer on Wafer) method is used, the first substrate 01 and the second substrate 02, both of which are in the form of wafer, are bonded together.

The first substrate 01 includes a pixel array 100 in which unit pixels 101 each including a light receiving element such as a photodiode are arranged in the form of a matrix. Light incident from the outside is photoelectrically converted in each of the unit pixels 101. As a result, a charge corresponding to the amount of incident light is generated in each unit pixel 101. Pixel control lines 102 are disposed so as to extend in a horizontal direction in an area of the pixel array 100. The unit pixel 101 includes a plurality of transistors, and thus each horizontal pixel control line 102 includes a plurality of lines although each horizontal pixel control line 102 includes only one line in a simplified drawing in FIG. 1.

The output of each unit pixel 101 is connected to a vertical signal line 103 for common use in the vertical direction. The pixel signals in each column are read out via corresponding one of the vertical signal lines 103.

There is no particular restriction on the number of pixels constituting the pixel array 100. For example, in the case of a general digital cameral, the pixel array 100 may includes pixels arranged in several thousand rows and several thousand columns, or in other applications, the pixel array 100 may include a plurality of pixels arranged in one row or one column.

The second substrate 02 includes a column AD conversion circuit 200, a column memory 201, a horizontal scanning circuit 202, a vertical scanning circuit 203, a reference signal generation circuit 204, a control circuit 205, and a timing generator (TG) 206. Furthermore, a digital signal processor (DSP) 207, a memory circuit 208, an output circuit 209, and a temperature sensor 210 are disposed on the substrate 02.

The vertical scanning circuit 203 outputs control signals for controlling turning-on/off (on/off states) of a plurality of transistors included in the pixel array 100. The control signals are supplied to the respective unit pixels 101 via the pixel control lines 102 provided for the respective rows of the pixel array 100. Each unit pixel 101 is controlled, in terms of resetting, signal reading, and the like, by the pixel control signal supplied from the vertical scanning circuit 203.

The pixel signal of the unit pixel 101 in the row selected by the vertical scanning circuit 203 is read out via the vertical signal line 103 used in common by pixels in the vertical direction, and is input to the column AD conversion circuit 200 in the subsequent stage.

The pixel signal in the analog form supplied to the column AD conversion circuit 200 is compared with a reference signal input to the column AD conversion circuit 200 from the reference signal generation circuit 204, and is AD-converted into a digital signal.

The control circuit 205 includes, for example, a phase synchronization circuit and a counter circuit, and supplies a control signal to the column AD conversion circuit 200 to control the AD conversion operation described above.

The TG 206 controls the operation timing of each circuit block.

In the AD conversion operation, processing such as correlated double sampling processing is performed based on the reset signal of the unit pixel 101 and the pixel signal obtained via the photoelectric conversion. An analog gain may be applied to the pixel signal before the AD conversion is performed, or a digital gain may be applied to the pixel signal after the AD conversion is performed.

The digital pixel signal obtained as a result of the AD conversion performed by the column AD conversion circuit 200 is input to the column memory 201 and held therein. For example, in a case where the analog output from the unit pixel 101 is AD-converted by the column AD conversion circuit 200 with a resolution of 10 bits, the column memory 201 has a storage capacity of 10 bits for each column.

The signal held in the column memory 201 is input, in response to the control signal output by the horizontal scanning circuit 202, to a DSP 207 via the common output line 211. In this process, high-speed reading is possible by providing a plurality of common output lines 211.

The DSP 207 executes a program stored, for example, in the memory circuit 208 so as to function as a machine learning unit that performs various processes using a trained model created by machine learning. For example, the trained model is created by machine learning using a deep neural network (DNN). Such a trained model is also called a neural network calculation model.

This trained model may be designed based on parameters which are generated when the input signal corresponding to the output from the pixel array 100 and training data associated with the label for this input signal are input to the particular machine learning model. The particular machine learning model may be a machine learning model using a multilayer neural network. Such a trained model is also called a multilayer neural network model.

Shading correction is described below as an example of an operation of the machine learning unit using the trained model stored in the memory circuit 208.

A large number of data sets each including amplification gain data, charge accumulation time data, and pixel output value data obtained for various conditions are prepared as training data. For each training data, learning is performed using set amplification gain and charge accumulation time as input information and a shading value of an image as a desired output. The model in the middle of learning is repeatedly updated until the difference between the shading value output as the predicted value by the training model and the actual shading value used as the training data becomes equal to smaller than a preset reference value. The trained model obtained by learning in the above-described manner is stored in the memory circuit 208, and is read out and used in the image processing performed by the DSP 207.

The temperature sensor 210 is a sensor circuit that outputs a signal corresponding to the temperature of the photoelectric conversion apparatus 00 to the outside. It is disposed close to the DSP 207, and the output signal provided by the temperature sensor 210 changes according to a change in the temperature of the DSP 207. Here, for example, when an end portion of the temperature sensor 210 is at a distance from an end portion of the DSP 207 within a range of about 200 μm, the temperature sensor 210 is regarded as being close to the DSP 207. Alternatively, the close location may be defined such that when there is no element such as a circuit block, a transistor, or the like in a smallest path between the end portion of the DSP 207 and the end portion of the temperature sensor 210, they are located close to each other.

The temperature sensor 210 is a signal output unit including a temperature sensor element that operates such that the voltage across the temperature sensor element changes depending on the temperature, and detects the temperature based on the voltage across the temperature sensor element and outputs a signal indicating the detected temperature. The temperature sensor element is realized, for example, by a diode, a bipolar transistor, or the like. The current-voltage characteristic of a PN junction diode or a bipolar transistor formed on a semiconductor substrate such as a silicon substrate is dependent on the temperature, and thus such an element can function as a temperature sensor element.

Figure 2:
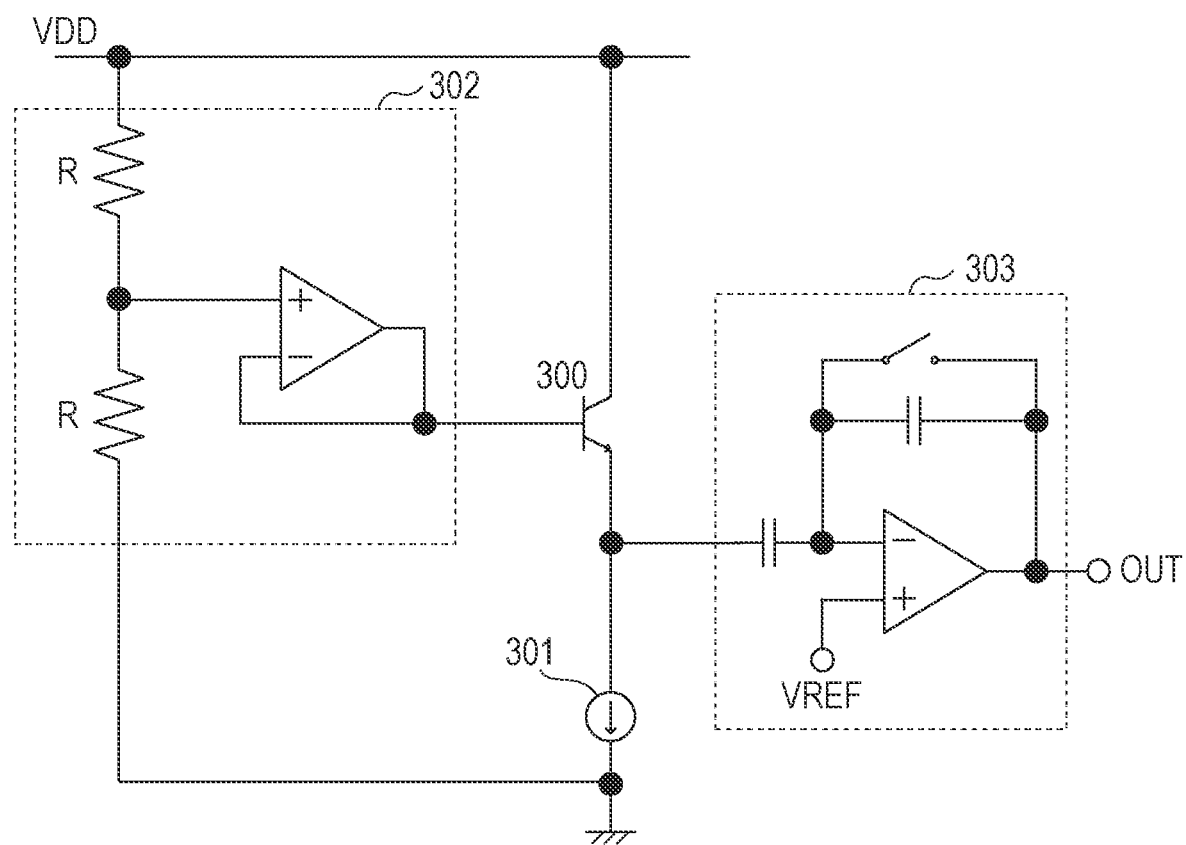
FIG. 2 is diagram illustrating an example of a configuration of a temperature sensor according to the first embodiment.

FIG. 2 shows an example of the temperature sensor 210.

The temperature sensor 210 shown in FIG. 2 includes a temperature sensor element 300, a constant current source 301, a bias voltage supply circuit 302, and an output amplification circuit 303.

A diode is used as the temperature sensor element 300. The bias voltage supply circuit 302 supplies a bias voltage Vb to the base of the temperature sensor element 300. The output amplification circuit 303 amplifies the emitter voltage of the temperature sensor element 300 and outputs the resultant amplified voltage. Each of the bias voltage supply circuit 302 and the output amplification circuit 303 includes at least an amplifier such as a differential amplifier circuit.

The bias voltage supply circuit 302 includes a differential amplifier circuit that functions as a voltage follower, and a voltage divider circuit using resistance elements for supplying a particular voltage to a non-inverting terminal of the differential amplifier circuit. Thus, a particular bias voltage determined by the resistance ratio of the resistance elements is supplied to the base of the temperature sensor element 300.

The output amplification circuit 303 includes a differential amplifier unit that functions as a voltage amplification circuit, and a capacitor element and a switch used for setting an amplification factor and holding a voltage. Thus, the emitter voltage of the temperature sensor element 300 is amplified by an amplification factor determined by the capacitance ratio of the capacitor elements. The configurations of the bias voltage supply circuit 302 and the output amplification circuit 303 are merely examples, and the configurations thereof are not limited to these examples.

Figure 3:
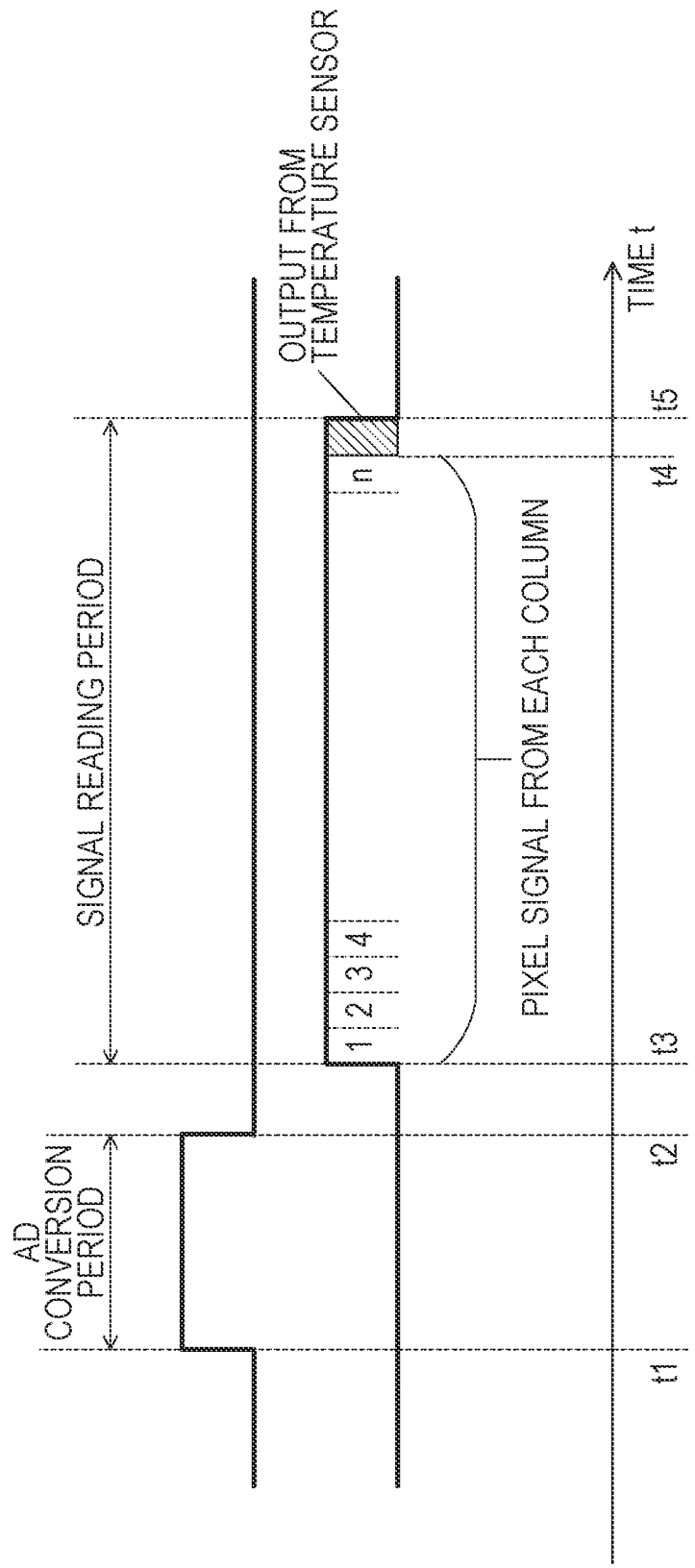
FIG. 3 is a timing chart according to the first embodiment.

FIG. 3 shows a timing chart of reading one line of pixel signal and reading a result of temperature detection performed by the temperature sensor 210.

In a period from time t1 to t2, the pixel signal and the temperature detection result are supplied to the column AD conversion circuit 200 and converted into digital signals. The digital signals obtained as a result of the AD conversion are input to the column memory 201 and stored therein.

In a period from time t3, the horizontal scanning circuit 202 operates so as to cause the pixel signals to be supplied from the column memory 201 to the DSP 207 via the common output line 211.

Furthermore, as shown in FIG. 3, in a period from time t4 to t5, the output from the temperature sensor is input to the DSP 207 as with the pixel signals.

In this configuration, as shown in FIG. 1, the output from the temperature sensor 210 is input to each of the column AD conversion circuits 200 disposed in the upper and lower areas of the substrate. The soundness of the readout circuit can be confirmed by AD-converting the same signal with the upper and lower readout circuits and comparing the results thereof. Note that the output signal from the temperature sensor 210 does not necessary need to be input to both the upper and lower readout circuits.

According to this configuration, as described above, the temperature detection result is output in addition to the pixel signal.

In the image processing performed by the DSP 207 using the machine learning, a large amount of data is processed at a high speed. Large-scale data processing may cause the temperature of the photoelectric conversion apparatus 00 to rise, which may cause an unexpected operation error to occur. When an operation error occurs, for example, data may be replaced by wrong-value data and output to the outside. Although such data is abnormal data, the abnormality may not be detected externally and may be treated as normal data.

According to the configuration of the present embodiment, the temperature change caused by the operation of the DSP 207 can be always detected by the temperature sensor 210. When a temperature rise exceeding a predetermined value is detected, it is possible to stop the processing operation of the DSP 207 or stop the operation of the photoelectric conversion apparatus 00, and/or it is possible send warning information to the outside via the output unit to notify that the data may not be correct. As described above, since the temperature sensor 210 is disposed in the vicinity of the DSP 207 where heat is predicted to be generated, the temperature change of the DSP 207 can be detected sensitively.

Although in this example, the detection result given by the temperature sensor 210 is input to the DSP 207 and the temperature is judged by the DSP 207, the detection result given by the temperature sensor 210 may be output, together with the pixel signals, to the outside of the photoelectric conversion apparatus 00, and the judgment on the temperature may be performed outside the photoelectric conversion apparatus 00. In the case where the result of the temperate judgment indicates that the temperature of the photoelectric conversion apparatus 00 is equal to or higher than a predetermined temperature, the image data may not be used or the operation of the photoelectric conversion apparatus 00 may be stopped.

In the present embodiment, the signal output by the temperature sensor is converted into a digital signal by the column AD conversion circuit and then output. However, the signal output by the temperature sensor may be directly output to the outside, and the temperature may be detected by an external circuit.

Data of temperature detected by the temperature sensor 210 may be added to the dataset used in the machine learning. By adding temperature information as one of the variables used in the image correction, it becomes possible to make a more accurate correction.

In the configuration described above, two stages of the pixel signal readout circuits are provided such that one is disposed on the upper and the other is disposed on the lower sides. However, only one stage of readout circuit may be provided, or three or more stages of readout circuits may be provided. By providing a plurality of readout circuits, the readout speed and the frame rate can be increased.

In the present embodiment, only the pixel array 100 is disposed on the first substrate 01, but other circuit blocks may be formed on the first substrate 01. Circuit blocks may be formed over a plurality of substrates.

Second Embodiment

A second embodiment of the present disclosure is described below with reference to FIG. 4. Detailed descriptions of elements which are similar to those in the first embodiment will be omitted, and the following description will focus on differences from the first embodiment.

Figure 4:
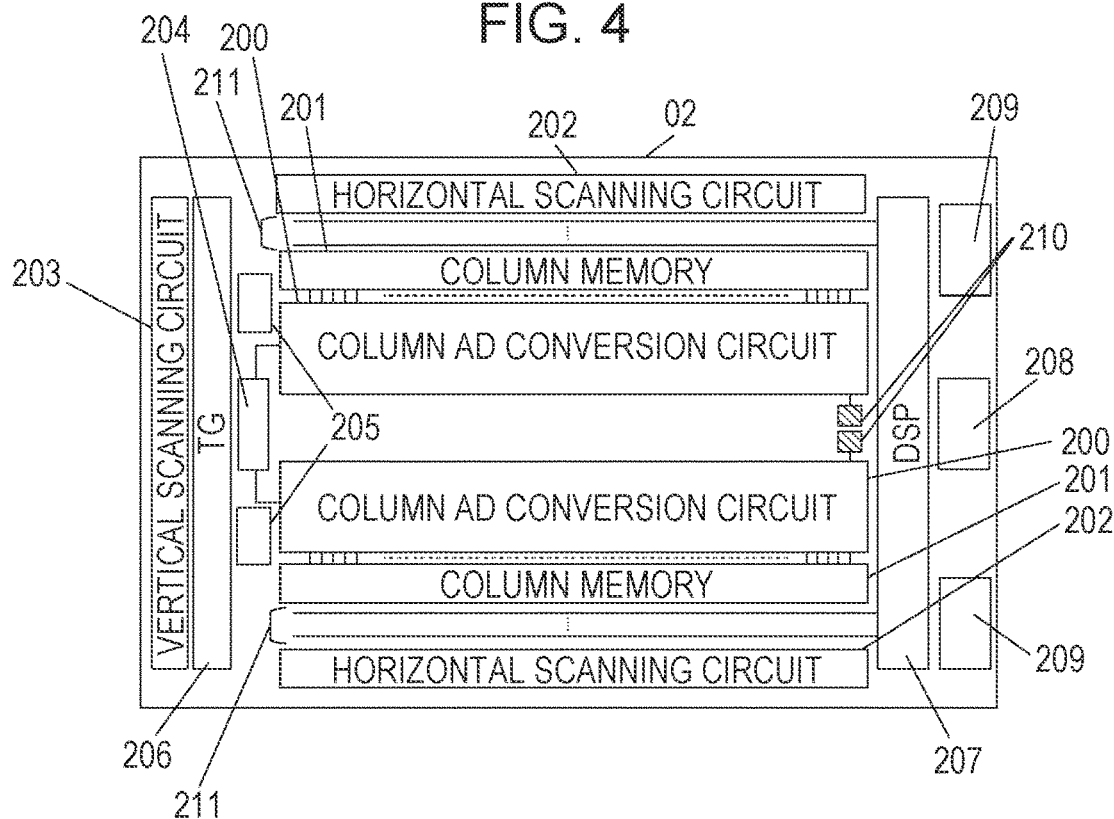
FIG. 4 is a schematic diagram illustrating a photoelectric conversion apparatus according to a second embodiment.

FIG. 4 is a schematic diagram illustrating a photoelectric conversion apparatus according to the second embodiment. The second embodiment is different from the first embodiment in that two temperature sensors 210 are provided in the vicinity of the DSP 207 on the second substrate 02. The two temperature sensors 210 are disposed such that there is no other element between them in the shortest path connecting the two temperate sensor 210, and they are separated by a distance equal to or less than 200 μm. In this configuration, the two temperature sensors 210 can be regarded to output substantially identical signals as long as they operate normally. Here, the two temperature sensors 210 may have the same structure or may have different configurations. In a case where temperature sensors having the same structure are used, the distance between the temperature sensors may be defined by the distance between elements (for example, transistors) having the same role in the respective temperature sensors. The distance between the two temperature sensors may be defined by the distance from the end of an active region of an element of one of the temperature sensors to the end of an active region of an element of the other one of the temperature sensor sensors.

One of the temperature sensors 210 disposed in the vicinity of the DSP 207 is read out via the upper readout circuit and input to the DSP 207, and the other is read out via the lower readout circuit and input to the DSP 207. The soundness of the readout circuits can be ensured by inputting the signal output from the temperature sensors to the DSP 207 via different paths that do not have a shared node.

The DSP 207 compares two signals, and if a temperature difference equal to or larger than a predetermined value is detected, it is determined that there is an abnormality. Since the two temperature sensors are located close to each other, if there is a difference in the output value equal to or larger than the predetermined value, it is determined that one of the temperature sensors has a failure.

In the first embodiment, even when the temperature sensor fails and a signal output from the temperature sensor indicates a temperature lower than an actual temperature, the failure of the temperature sensor cannot be detected. Therefore, there is a possibility that the operation is continued without detecting the increase in temperature rise, or the incorrect detected temperature may cause inappropriate correction data to be applied.

According to the present embodiment, when a failure occurs in the temperature sensors 210, it is possible to detect the failure by comparing the signals output by the two temperature sensors 210 disposed close to each other.

In the present embodiment, the DSP 207 compares the results of the two temperature sensors. However, alternatively, the signals output by the temperature sensors may be output to the outside of the photoelectric conversion apparatus 00, and the signals output by the temperature sensors may be compared outside the photoelectric conversion apparatus 00.

Third Embodiment

A third embodiment of the present disclosure is described below with reference to FIG. 5. Detailed descriptions of elements which are similar to those in the first embodiment or the second embodiment will be omitted, and the following description will focus on differences from the first and second embodiments.

Figure 5:
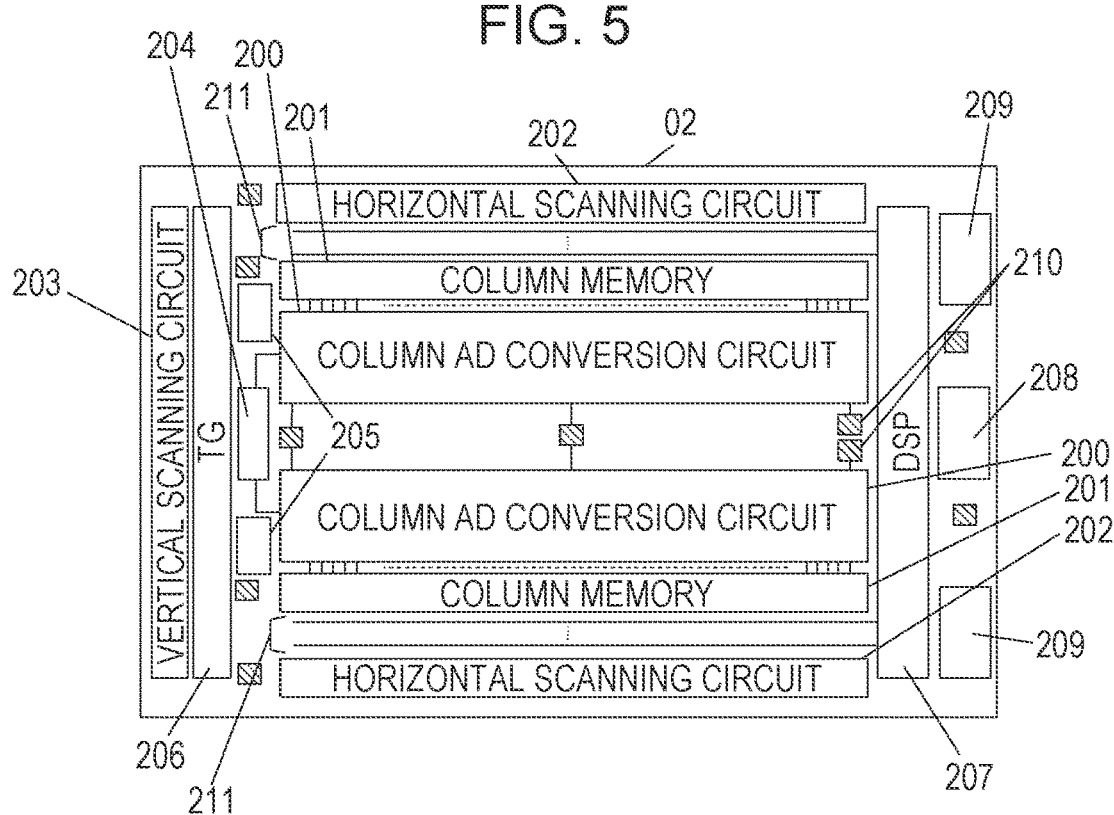
FIG. 5 is a schematic diagram illustrating a photoelectric conversion apparatus according to a third embodiment.

FIG. 5 is a schematic diagram illustrating a photoelectric conversion apparatus according to a third embodiment. The third embodiment is different from the first and second embodiments in that the temperature sensors 210 are disposed at a plurality of locations on the second substrate 02. In addition to disposing temperature sensors in the vicinity of the DSP 207 as in the second embodiment, temperature sensors are also disposed in the vicinity of the circuit blocks such as the control circuit 205, the reference signal generation circuit 204, and the output circuit 209, where heat is generated. Although omitted in the figure, the signals of these plurality of temperature sensors 210 are AD-converted and read out by the column AD conversion circuit as in the first embodiment. Furthermore, a temperature sensor 210 is also disposed in a region near the center of the substrate where the number of disposed circuit elements per unit area is small, and the circuit density is relatively low. For example, when the second substrate 02 is produced, the substrate is divided into a part and another part, and these divided parts are exposed separately. The areas of the divided parts may be partially overlapped in the exposure using a so-called connection exposure process. In the overlapping area, the number of circuit elements per unit area is smaller than that in the non-overlapping area. A temperature sensor may be disposed in this overlapping region.

The power consumption and the amount of generated heat in an area where the circuit density is low are different from those in an area where the circuit density is high. By disposing temperature sensors in both the area where the circuit density is low and the area where the circuit density is high, it becomes possible to detect a temperature distribution of the second substrate 02.

In the present embodiment, the AD conversion is performed by the column AD conversion circuit. However, an additional circuit may be provided for performing the AD conversion on the signal output from the temperature sensor.

According to the present embodiment, it is possible to grasp the temperature distribution of the entire second substrate 02 while monitoring an occurrence of an abnormal temperature rise in the vicinity of circuits such as the DSP 207 and other circuits that can be heat generation sources. Data of the temperature distribution detected by the plurality of temperature sensors 210 may be added to the dataset used in the machine learning, thereby making it possible to perform a more accurate correction.

Fourth Embodiment

A fourth embodiment of the present disclosure is described below with reference to FIG. 6 and FIG. 7. Detailed descriptions of elements which are similar to those in one of the first to third embodiments will be omitted, and the following description will focus on differences from the first to third embodiments.

Figure 6:
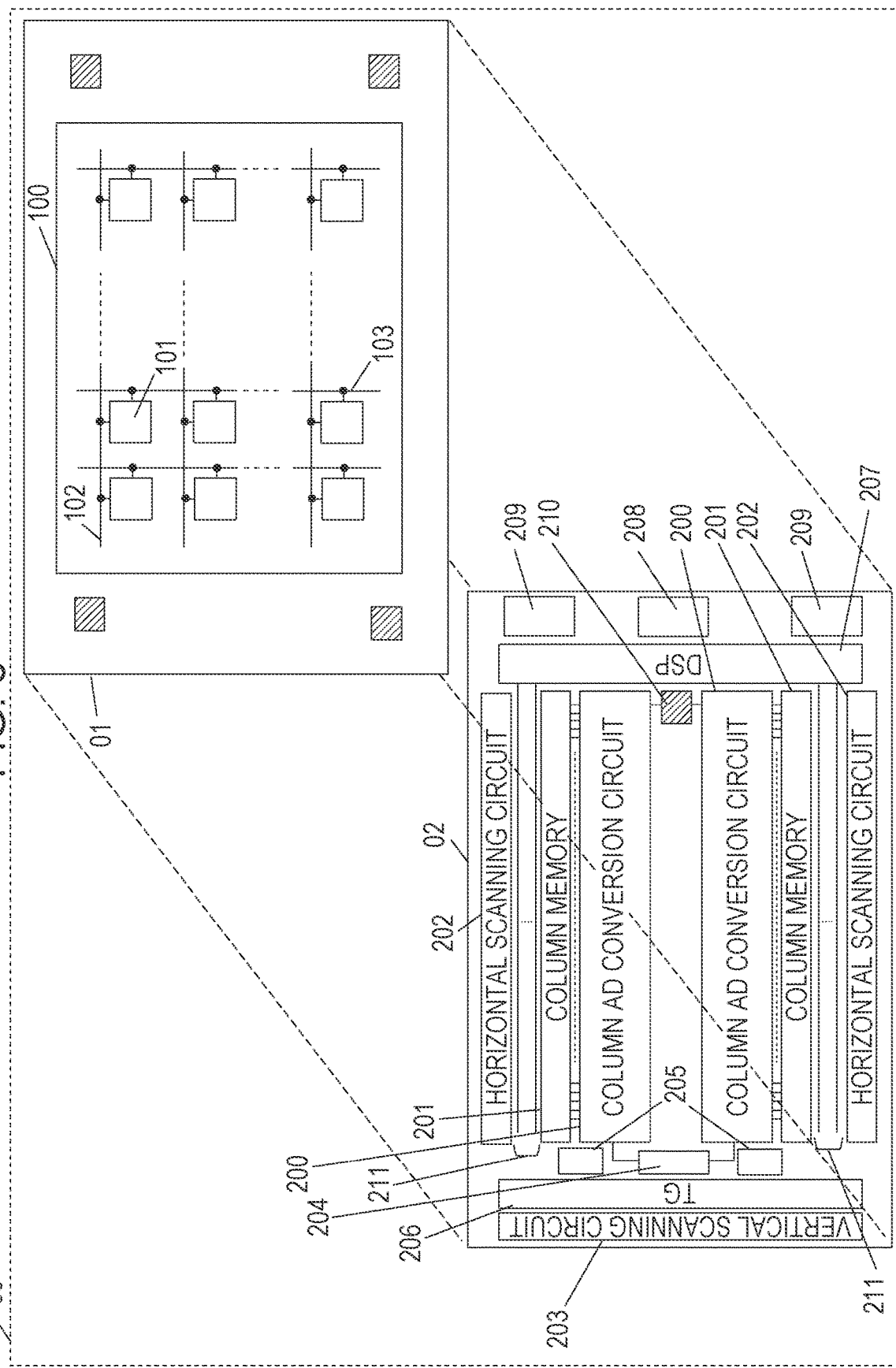
FIG. 6 is a schematic diagram illustrating a photoelectric conversion apparatus according to a fourth embodiment.

FIG. 6 is a schematic diagram illustrating a photoelectric conversion apparatus according to the fourth embodiment. The fourth embodiment is different from the first embodiment in that a temperature sensor 210 is also provided on the first substrate 01.

The increase in temperature also affects the amount of dark current generated in the unit pixel 101, it is also important to detect the temperature in the vicinity of the pixel on the first substrate. In the fourth embodiment, as shown in FIG. 6, temperature sensors are disposed around the pixel array 100. The signals output from these temperature sensors are input to the column AD conversion circuit 200 via the inter-substrate connection as in the first embodiment. The AD-converted temperature information is input to the DSP 207 as in the first embodiment.

The connection between the first substrate 01 and the second substrate 02 is realized by metal-to-metal bonding (metal bonding) or by using a via such as a TSV as a connection part. In the case of metal-to-metal bonding, bonding at the connection plane is made such that insulators of the first substrate 01 are connected to insulators of the second substrate 01 and metals of the first substrate 01 and connected metals of the second substrate 02.

Figure 7:
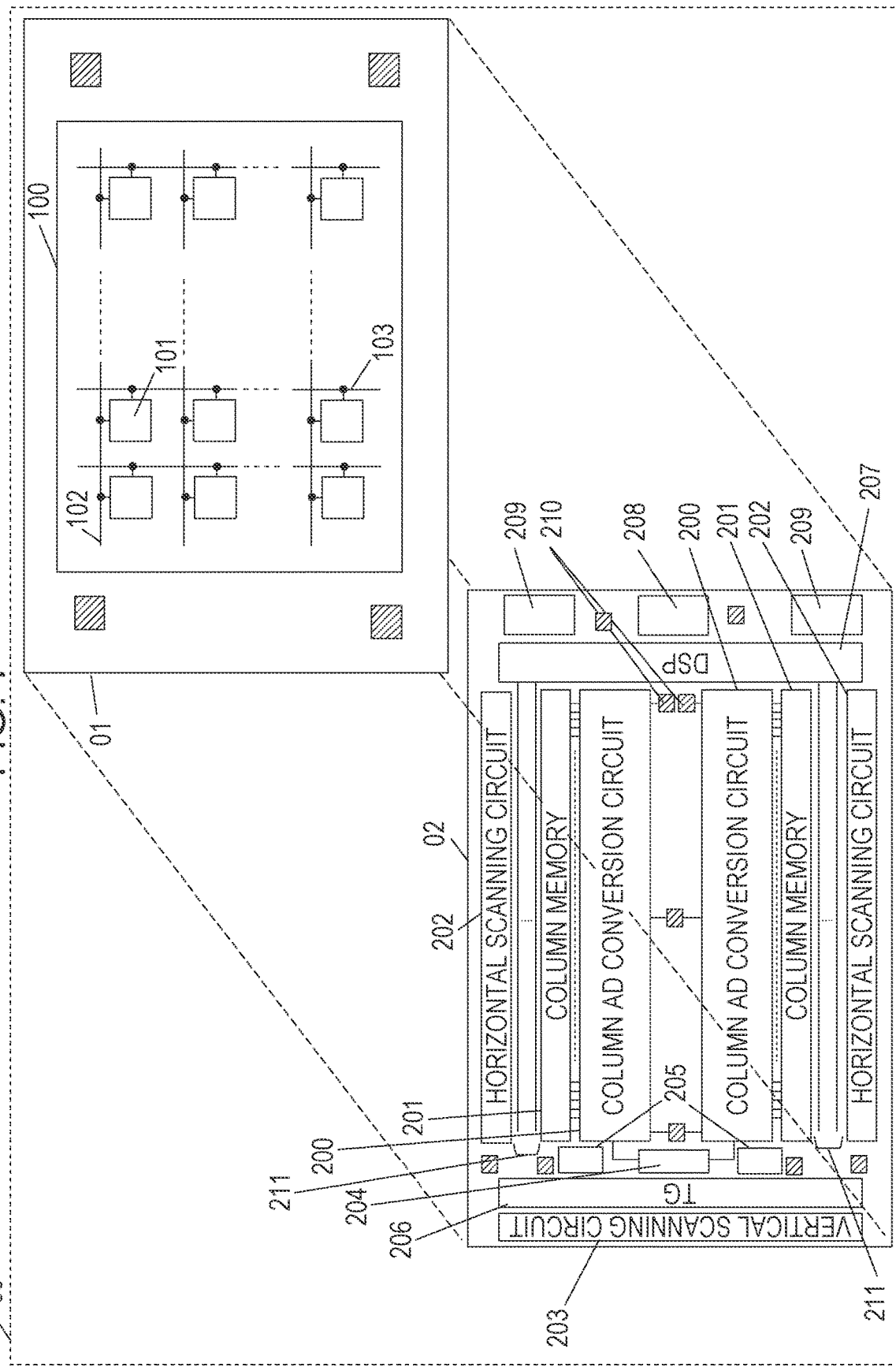
FIG. 7 is a schematic diagram illustrating a photoelectric conversion apparatus according to the fourth embodiment.

A shown in FIG. 7, a plurality of temperature sensors 210 may be disposed on the second substrate 02 as in the third embodiment. This configuration makes it possible to detect the temperature change and temperature distribution of the first substrate 01 and the second substrate. Furthermore, it becomes possible to add the temperature distribution information of the first substrate 01 and the second substrate 02 to the data set used in the machine learning, and thus it becomes possible to perform more accurate image correction as compared with the first to third embodiments.

In the present embodiment, the AD conversion is performed by the column AD conversion circuit. However, an additional circuit may be provided for performing the AD conversion on the signal output from the temperature sensor.

Fifth Embodiment

Figure 8:
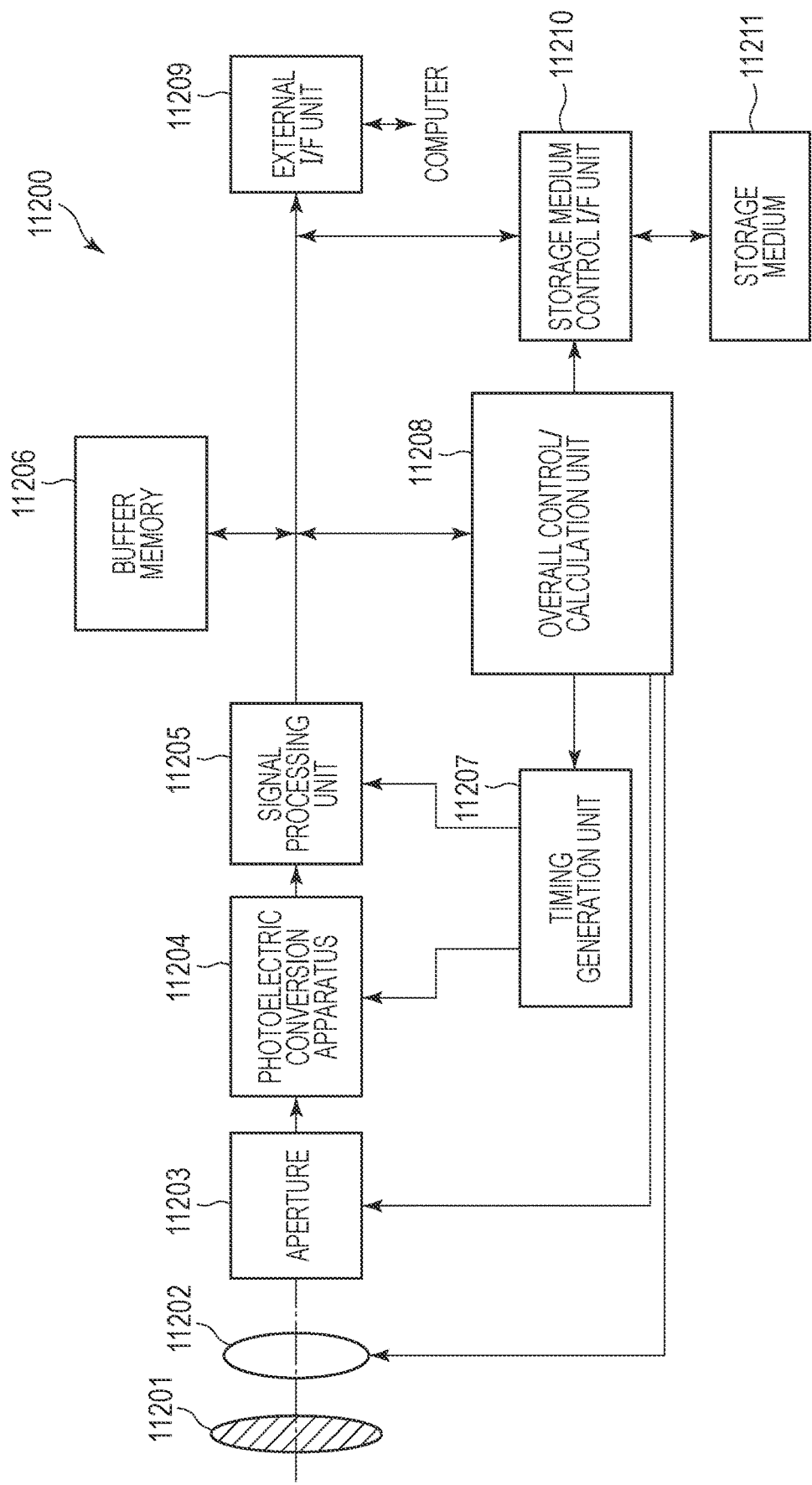
FIG. 8 is a functional block diagram of a photoelectric conversion system according to a fifth embodiment.

FIG. 8 is a block diagram showing a configuration of a photoelectric conversion system 11200 according to a seventh embodiment. The photoelectric conversion system 11200 according to this embodiment includes a photoelectric conversion apparatus 11204. As for the photoelectric conversion apparatus 11204, the photoelectric conversion apparatus according to one of embodiments described above may be used. The photoelectric conversion system 11200 may be used, for example, as an imaging system. Specific examples of the imaging system include a digital still camera, a digital camcorder, a security camera, a network camera, a microscope, and the like. In the example shown in FIG. 8, the photoelectric conversion system 11200 is used as a digital still camera.

The photoelectric conversion system 11200 shown in FIG. 8 includes a photoelectric conversion apparatus 11204 and a lens 11202 that forms an optical image of a subject on the photoelectric conversion apparatus 11204. The photoelectric conversion system 11200 further includes an aperture 11203 for varying the amount of light passing through the lens 11202, and a barrier 11201 for protecting the lens 11202. The lens 11202 and the aperture 11203 constitute an optical system that focuses light on the photoelectric conversion apparatus 11204.

The photoelectric conversion system 11200 also includes a signal processing unit 11205 that processes an output signal provided from the photoelectric conversion apparatus 11204. The signal processing unit 11205 performs a signal processing operation of performing various corrections and compressions on the input signal as necessary and outputting the signal. The photoelectric conversion system 11200 further includes a buffer memory unit 11206 for temporarily storing image data and an external interface unit (external I/F unit) 11209 for communicating with an external computer or the like. The photoelectric conversion system 11200 further includes a storage medium 11211 such as a semiconductor memory for storing and reading image data, and a storage medium control interface unit (storage medium control I/F unit) 11210 via which to store or read image data in/from the storage medium 11211. The storage medium 11211 may be disposed inside the photoelectric conversion system 11200 or may be detachable. Communication between the storage medium control I/F unit 11210 and the storage medium 11211 and/or communication with the external I/F unit 11209 may be performed wirelessly.

The photoelectric conversion system 11200 further includes an overall control/calculation unit 11208 that performs various calculations and controls the entire digital still camera, and a timing generation unit 11207 that outputs various timing signals to the photoelectric conversion apparatus 11204 and the signal processing unit 11205. The timing signal or the like may be input from the outside. In this case, the photoelectric conversion system 11200 may include at least the photoelectric conversion apparatus 11204 and the signal processing unit 11205 that processes an output signal provided from the photoelectric conversion apparatus 11204. The overall control/calculation unit 11208 and the timing generation unit 11207 may be configured to perform part or all of the control functions of the photoelectric conversion apparatus 11204.

The photoelectric conversion apparatus 11204 outputs an image signal to the signal processing unit 11205. The signal processing unit 11205 performs particular signal processing on the image signal output from the photoelectric conversion apparatus 11204, and outputs resultant image data. Furthermore, the signal processing unit 11205 generates an image using the image signal. The signal processing unit 11205 may perform a distance measurement calculation on the signal output from the photoelectric conversion apparatus 11204. The signal processing unit 11205 and the timing generation unit 11207 may be disposed on the photoelectric conversion apparatus. That is, the signal processing unit 11205 and the timing generation unit 11207 may be disposed on a substrate on which pixels are arranged, or may be disposed on another substrate. By forming an imaging system using the photoelectric conversion apparatus according to one of the embodiments described above, it is possible to realized an imaging system capable of acquiring a higher quality image.

Sixth Embodiment

Figure 9:
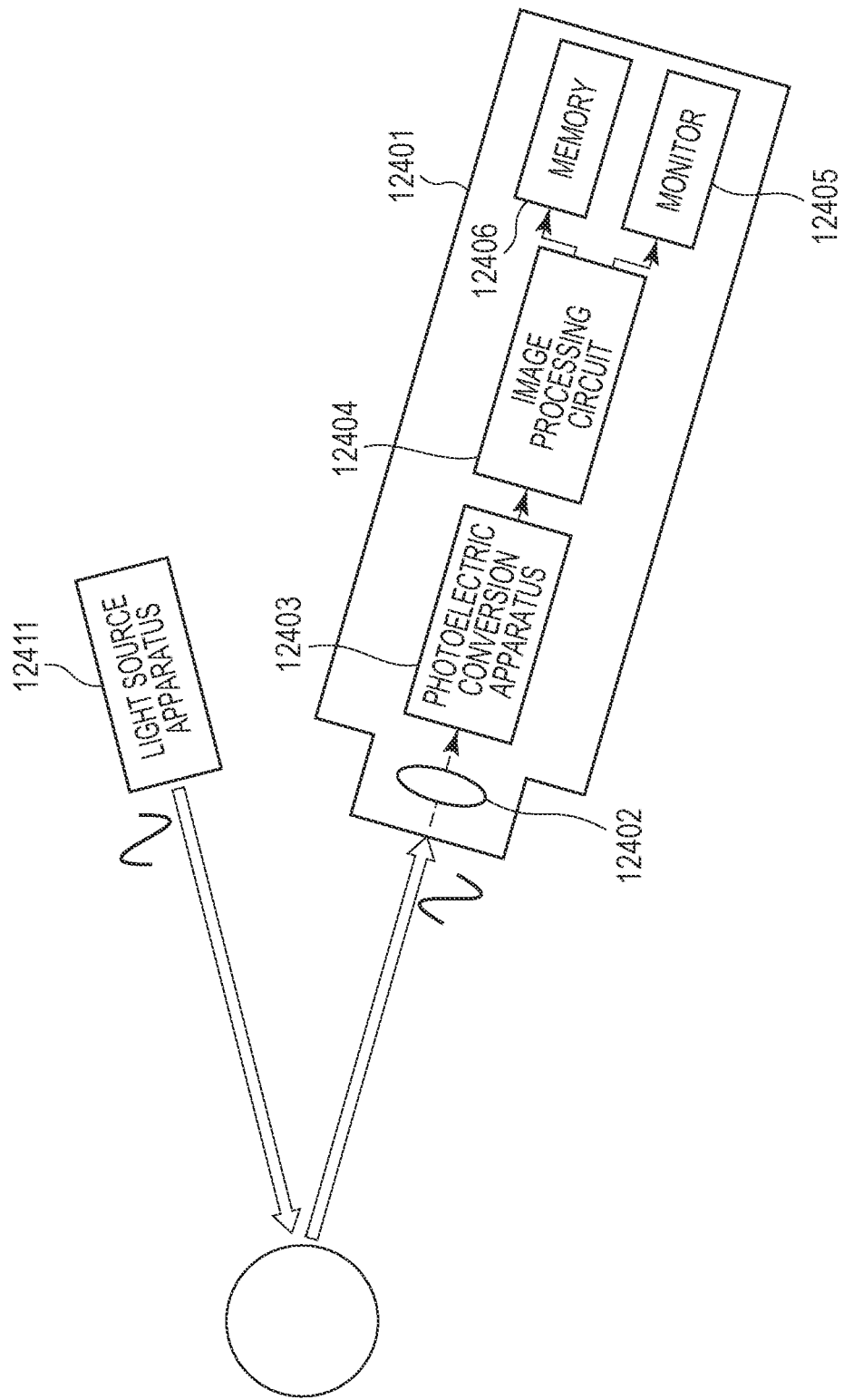
FIG. 9 is a functional block diagram of a distance sensor according to a sixth embodiment.

FIG. 9 is a block diagram showing an example of a configuration of a distance image sensor, which is an electronic device realized using the photoelectric conversion apparatus according to one of the embodiments described above.

As shown in FIG. 9, the distance image sensor 12401 includes an optical system 12407, a photoelectric conversion apparatus 12408, an image processing circuit 12404, a monitor 12405, and a memory 12406. The distance image sensor 12401 acquires a distance image indicating a distance to a subject by receiving light (modulated light or pulsed light) that is projected from a light source apparatus 12409 toward the subject and reflected by the surface of the subject.

The optical system 12407 includes one or a plurality of lenses and functions to conduct image light (incident light) from a subject to the photoelectric conversion apparatus 12408 so as to form an image on a light receiving surface (a sensor unit) of the photoelectric conversion apparatus 12408.

As the photoelectric conversion apparatus 12408, the photoelectric conversion apparatus according to one of the embodiments described above is used. A distance signal indicating a distance is obtained from a light reception signal output from the photoelectric conversion apparatus 12408, and the resultant distance signal is supplied to the image processing circuit 12404.

The image processing circuit 12404 performs image processing for constructing a distance image based on the distance signal supplied from the photoelectric conversion apparatus 12408. The distance image (image data) obtained by the image processing is supplied to the monitor 12405 and displayed thereon, or supplied to the memory 406 and stored (recorded) therein.

In the distance image sensor 12401 configured in the above-described manner, use of the photoelectric conversion apparatus with higher-quality pixels described above makes it possible to acquire, for example, a more accurate distance image.

Seventh Embodiment

The techniques according to the present disclosure (the present techniques) can be applied to various products. For example, the techniques according to the present disclosure may be applied to endoscopic surgery systems.

Figure 10:
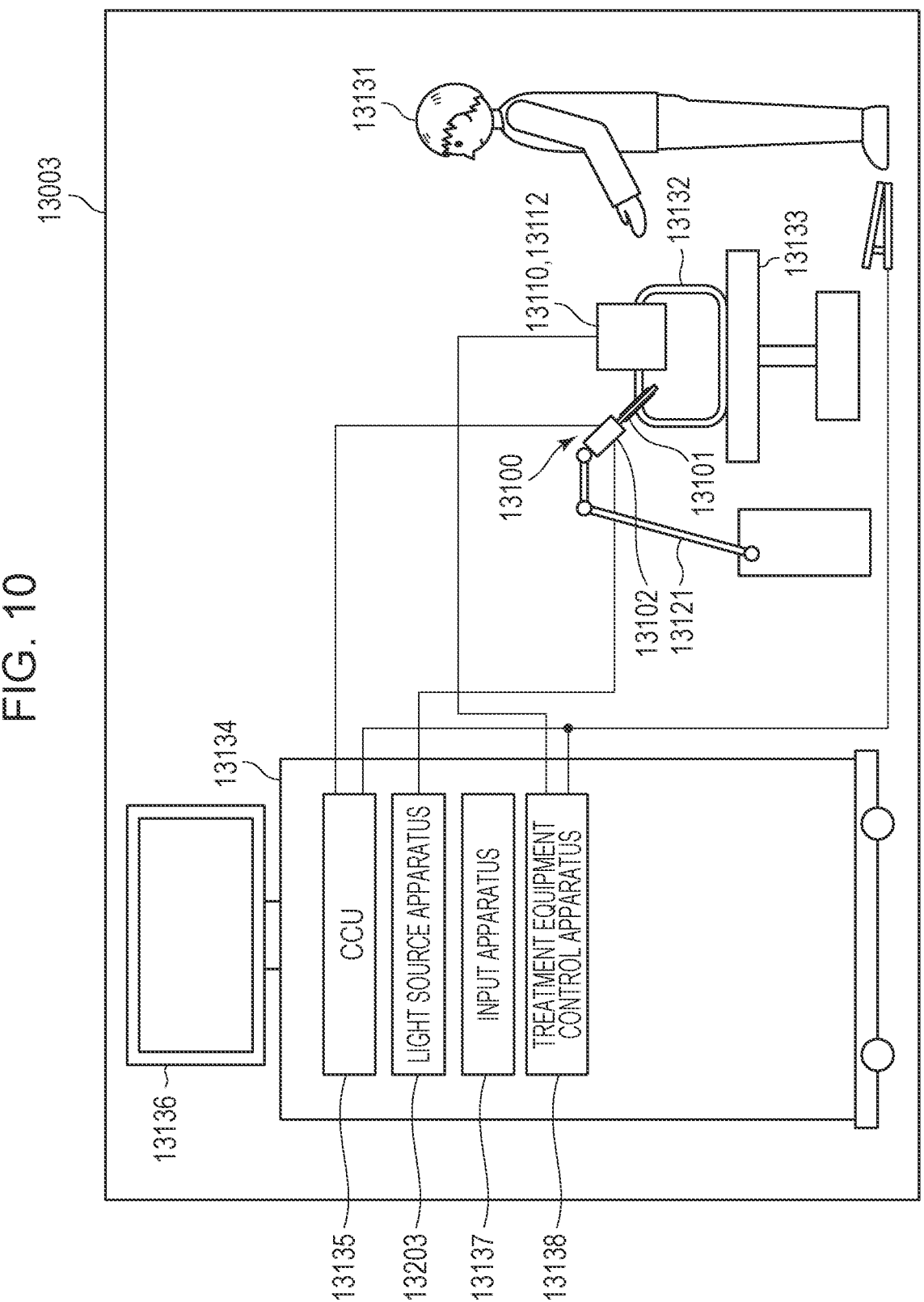
FIG. 10 is a functional block diagram of a endoscopic surgery system according to a seventh embodiment.

FIG. 10 is a schematic diagram showing an example of a configuration of an endoscopic surgery system to which the technique according to the present disclosure (the present technique) can be applied.

More specifically, FIG. 10 illustrates a manner in which a surgeon (doctor) 13131 performs surgery on a patient 13132 on a patient bed 13133 using an endoscopic surgery system 13003. As shown, the endoscopic surgery system 13003 includes an endoscope 13100, a surgical tool 13110, and a cart 13134 equipped with various apparatuses for endoscopic surgery.

The endoscope 13100 includes a lens barrel 13101 whose anterior part with a particular length is inserted in body cavity of the patient 13132, and a camera head 13102 connected to a base end of the lens barrel 13101. In the example shown in FIG. 10, the endoscope 13100 is configured as a so-called rigid endoscope having the rigid barrel 13101. However the endoscope 13100 may be configured as a so-called flexible endoscope having a flexible barrel.

An opening in which an objective lens is fitted is formed at the tip of the lens barrel 13101. A light source apparatus 13203 is connected to the endoscope 13100. Light generated by the light source apparatus 13203 is guided to the tip of the lens barrel by a light guide extending inside the lens barrel 13101. This light is emitted through the objective lens toward an observation target object in the body cavity of the patient 13132. The endoscope 13100 may be a forward-viewing endoscope, a forward-oblique viewing endoscope, or a side viewing endoscope.

An optical system and a photoelectric conversion apparatus are provided inside the camera head 13102, and reflected light (observation light) from the observation target object is focused on the photoelectric conversion apparatus by the optical system. The observation light is photoelectrically converted by the photoelectric conversion apparatus into an electric signal corresponding to the observation light. As a result, an image signal corresponding to the observation image is obtained. As the photoelectric conversion apparatus, the photoelectric conversion apparatus according to one of the embodiments described above may be used. The image signal is transmitted as RAW data to the camera control unit (CCU) 13135.

The CCU 13135 includes a CPU (Central Processing Unit), a GPU (Graphics Processing Unit), etc., and generally controls the operations of the endoscope 13100 and the display apparatus 13136. Furthermore, the CCU 13135 receives the image signal from the camera head 13102, and performs various image processing such as development processing (demosaic processing) on the image signal for displaying an image based on the image signal.

The display apparatus 13136 displays, under the control of the CCU 13135, the image based on the image signal subjected to the image processing by the CCU 13135.

The light source apparatus 13203 includes a light source such as an LED (Light Emitting Diode), and supplies irradiation light to the endoscope 13100 when an image of an operation part or the like is captured.

The input apparatus 13137 functions as an input interface to the endoscopic surgery system 13003. A user can input various information and instructions to the endoscopic surgery system 13003 via the input apparatus 13137.

The treatment equipment control apparatus 13138 controls driving of energy treatment equipment 13112 for cauterization or incision of a tissue, sealing of blood vessels, etc.

The light source apparatus 13203 for supplying irradiation light to the endoscope 13100 when an image of an operation part is captured may be realized using a white light source using an LED, a laser light source, or a combination thereof. In a case where the white light source is realized by a combination of RGB laser light sources, it is possible to accurately control the output intensity and output timing of each color (each wavelength), and thus the light source apparatus 13203 can adjust the white balance of the captured image. Furthermore, in this case, an image may be captured such that the laser light from each of the RGB laser light sources is supplied to the observation target object in a time-division manner, and the imaging device of the camera head 13102 is driven in synchronization with the light supplying timing so as to capture an image of each color in the time-division manner. In this method, a color image can be obtained without providing a color filter on the imaging device.

The light source apparatus 13203 may be controlled such that the intensity of the output light is changed at particular time intervals. By controlling the imaging device of the camera head 13102 to be driven in synchronization with the timing of the change in the light intensity to acquire images in a time-division manner and combining the images, it is possible to generate an image with a high dynamic range without having underexposure and overexposure.

The light source apparatus 13203 may be configured to be able to supply light in a particular wavelength band for special light observation. The special light observation is realized by using, for example, dependence of absorption of light by body tissues on wavelength of light absorption in body tissues. More specifically, a target tissue such as a blood vessel on the surface layer of a mucous membrane may be irradiated with light with a narrow band compared with normal irradiation light (that is, white light) thereby obtaining an image of the target issue with high contrast. Alternatively, the special light observation may be realized by fluorescence observation in which an image is obtained by fluorescence which occurs when a target is irradiated with excitation light. In the fluorescence observation, a body tissue is irradiated with excitation light, and fluorescence that occurs on the body tissue in response to the excitation by light is observed, or a reagent such as indocyanine green (ICG) is locally injected into the body tissue and the body tissue is irradiated with excitation light with a wavelength corresponding to the fluorescence wavelength of the reagent and a resultant fluorescence image is observed. As described above, the light source apparatus 13203 may be configured to be capable of supplying narrow band light and/or excitation light for the special light observation.

Eighth Embodiment

Figure 11A:
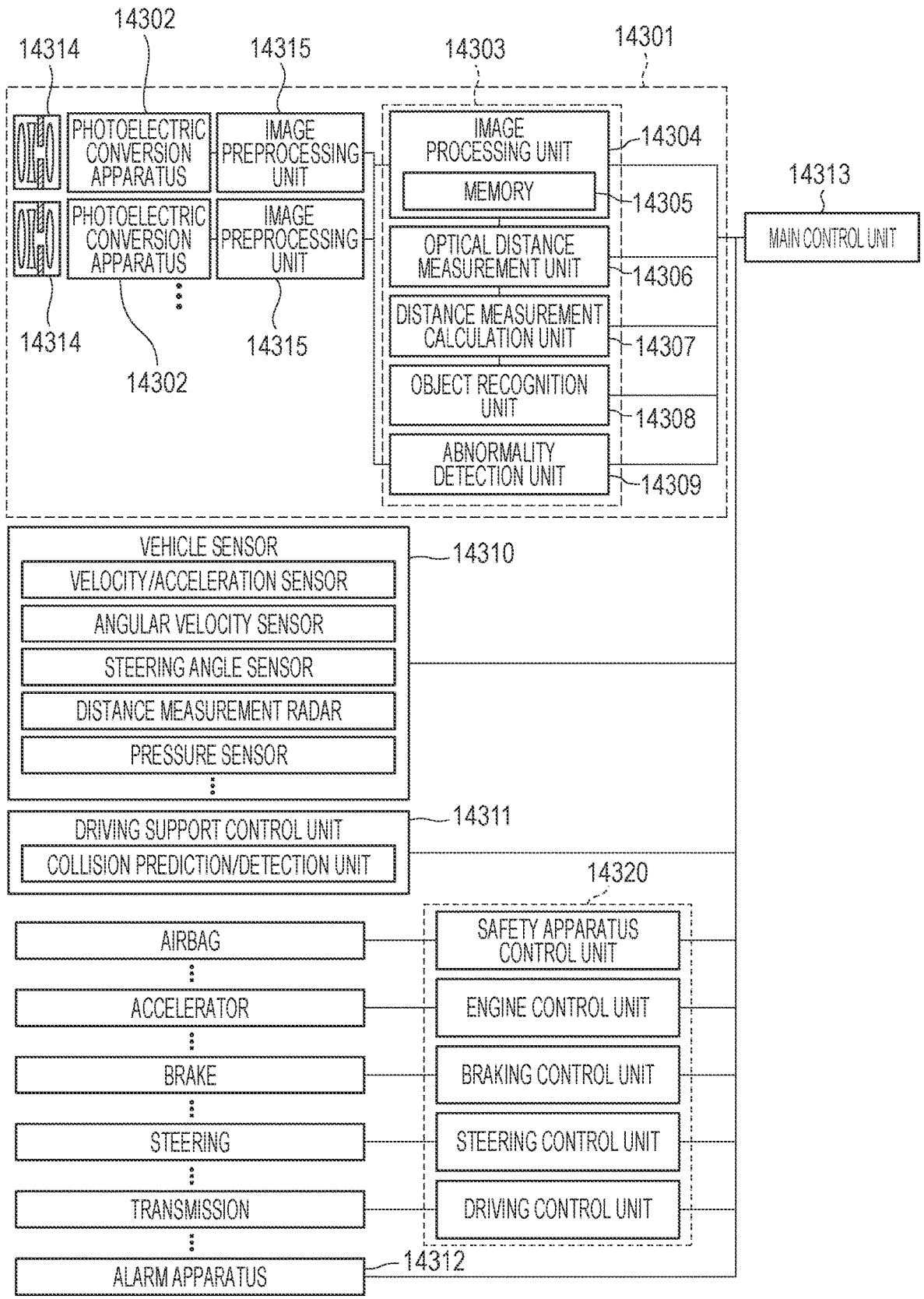
FIG. 11A is a diagram illustrating a photoelectric conversion system according to an eighth embodiment.

A photoelectric conversion system and a mobile body according to an eighth embodiment are described below with reference to FIGS. 11A and 11B. FIG. 11A is a schematic view showing an example of a configuration of a photoelectric conversion system according to the eighth embodiment and FIG. 11B shows an example of a configuration of a mobile body according to the eighth embodiment. In this embodiment, an in-vehicle camera is described as an example of the photoelectric conversion system.

More specifically, FIG. 11B shows an example of a vehicle system and FIG. 11A shows an example of a photoelectric conversion system for imaging disposed in the vehicle system. The photoelectric conversion system 14301 includes a photoelectric conversion apparatus 14302, an image preprocessing unit 14315, an integrated circuit 14303, and an optical system 14314. The optical system 14314 forms an optical image of a subject on the photoelectric conversion apparatus 14302. The photoelectric conversion apparatus 14302 converts the optical image of the subject formed by the optical system 14314 into an electric signal. The photoelectric conversion apparatus 14302 may be a photoelectric conversion apparatus according to one of the embodiments described above. The image preprocessing unit 14315 performs particular signal processing on the signal output from the photoelectric conversion apparatus 14302. The function of the image preprocessing unit 14315 may be incorporated in the photoelectric conversion apparatus 14302. The photoelectric conversion system 14301 includes at least two sets of the optical system 14314, the photoelectric conversion apparatus 14302, and the image preprocessing unit 14315, and is configured such that a signal output from the image preprocessing unit 14315 of each set is input to the integrated circuit 14303.

The integrated circuit 14303 is an integrated circuit designed for use in imaging system applications, and includes an image processing unit 14304 including a memory 14305, an optical distance measurement unit 14306, a distance measurement calculation unit 14307, an object recognition unit 14308, and an abnormality detection unit 14309. The image processing unit 14304 performs image processing such as development processing and/or defect correction processing on the output signal provided from the image preprocessing unit 14315. The memory 14305 temporarily stores the captured image and information indicating a position of a defect pixel. The optical distance measurement unit 14306 performs focusing of an image of a subject, and distance measurement processing. The distance measurement calculation unit 14307 calculates the distance from a plurality of image data acquired by the plurality of photoelectric conversion apparatuses 14302 thereby obtaining distance measurement information. The object recognition unit 14308 recognizes a subject such as a car, a road, a sign, or a person. When the abnormality detection unit 14309 detects an abnormality in the photoelectric conversion apparatus 14302, the abnormality detection unit 14309 notifies a main control unit 14313 of the abnormality.

The integrated circuit 14303 may be realized by hardware designed for dedicated use or by a software module, or may be realized by a combination thereof. Alternatively, the integrated circuit 14303 may be realized by an FPGA (Field Programmable Gate Array), an ASIC (Application Specific Integrated Circuit), or the like, or may be realized by a combination thereof.

The main control unit 14313 generally controls the operations of the photoelectric conversion system 14301, the vehicle sensor 14310, the control unit 14320, and the like. The main control unit 14313 may not be provided. In this case, a communication interface may be provided in each of the photoelectric conversion system 14301, the vehicle sensor 14310, and the control unit 14320, and a control signal may be transmitted among the photoelectric conversion system 14301, the vehicle sensor 14310, and the control unit 14320 via a communication network (according to, for example, CAN standard).

The integrated circuit 14303 has a function of transmitting a control signal or a setting value to the photoelectric conversion apparatus 14302 according to a control signal received from the main control unit 14313 or according to a control signal generated inside the integrated circuit 14303.

The photoelectric conversion system 14301 is connected to the vehicle sensor 14310, and can detect a running state in terms of the vehicle speed, yaw rate, steering angle and the like of the vehicle on which the photoelectric conversion system 14301 is disposed and also can detect a state of the environment outside the vehicle, the state of other vehicles/obstacles. The vehicle sensor 14310 also functions as a distance information acquisition unit for acquiring distance information indicating a distance to an object. The photoelectric conversion system 14301 is connected to a driving support control unit 1311 that provides various driving support such as automatic steering, automatic cruising, collision prevention, and/of the like. A collision prediction/detection function is also provided. In this function, a collision with another vehicle/object is predicted or an occurrence of a collision is detected based on a detection result provided by the photoelectric conversion system 14301 and/or the vehicle sensor 14310. When a collision is predicted, a control operation to avoid the collision is performed, and a safety apparatus is activated in the event of the collision.

The photoelectric conversion system 14301 is also connected to an alarm apparatus 14312 that issues an alarm to a driver based on the prediction/detection result by the collision prediction/detection unit. For example, in a case where the prediction/detection result by the collision prediction/detection unit indicates that a collision is going to occur with a high probability, the main control unit 14313 controls the vehicle to avoid the collision or reduce a damage by applying the brakes, releasing the accelerator, or suppressing the engine output.

The alarm apparatus 14312 warns the user by sounding an alarm, displaying alarm information on a display screen of a car navigation system or a meter panel, or vibrating a seat belt or a steering wheel.

In the present embodiment, an image around the vehicle is captured by the photoelectric conversion system 14301. More specifically, for example, an image of an environment in front of or behind the vehicle is captured. FIG. 11B shows an example of a manner of disposing the photoelectric conversion systems 14301 for a case where an image of an environment in front of the vehicle is captured by the photoelectric conversion system 14301.

The two photoelectric conversion apparatuses 14302 are disposed on the front of the vehicle 14300. More specifically, the center line of the external shape (for example, the width) of the vehicle 14300 extending in forward/backward running direction is taken as an axis of symmetry, and the two photoelectric conversion apparatuses 1302 are disposed line-symmetrically about the axis of symmetry. This configuration may be desirable for acquiring distance information indicating the distance between the vehicle 14300 and an imaging target object, and desirable for determining the possibility of collision.

The photoelectric conversion apparatuses 14302 may be disposed so as not to obstruct the field of view of the driver who is trying to view the situation outside the vehicle 14300 from the driver's seat. The alarm apparatus 14312 is preferably disposed such that the driver can be easily view the alarm apparatus 14312.

In the embodiment described above, by way of example, the control is performed to avoid a collision with another vehicle. However, the present embodiment can also be applied to a control to automatically drive following another vehicle, a control to automatically drive so as not to go out of a lane, and the like. Furthermore, the photoelectric conversion system 14301 can be applied not only to a vehicle but also to a mobile body (a mobile apparatus) such as a ship, an aircraft, an industrial robot, and/or the like. Furthermore, it can be applied not only to mobile bodies but also to a wide variety of devices that use object recognition processing, such as intelligent transportation systems (ITS).

The photoelectric conversion apparatus according to the present disclosure may be configured to be capable of acquiring various information such as distance information.

Ninth Embodiment

Figure 12A:
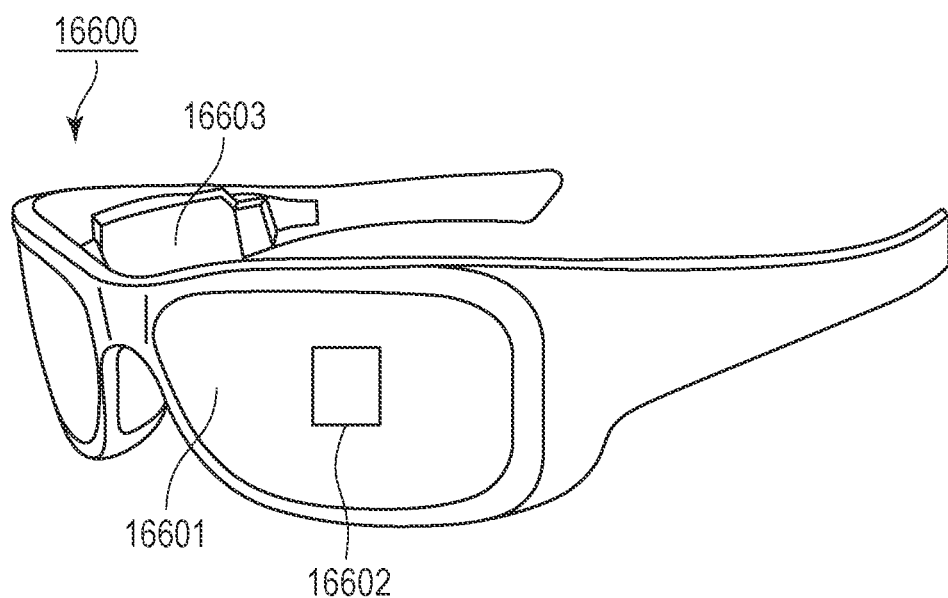
FIGS. 12A and 12B are each a schematic view of smart glasses according to a ninth embodiment.
Figure 12B:
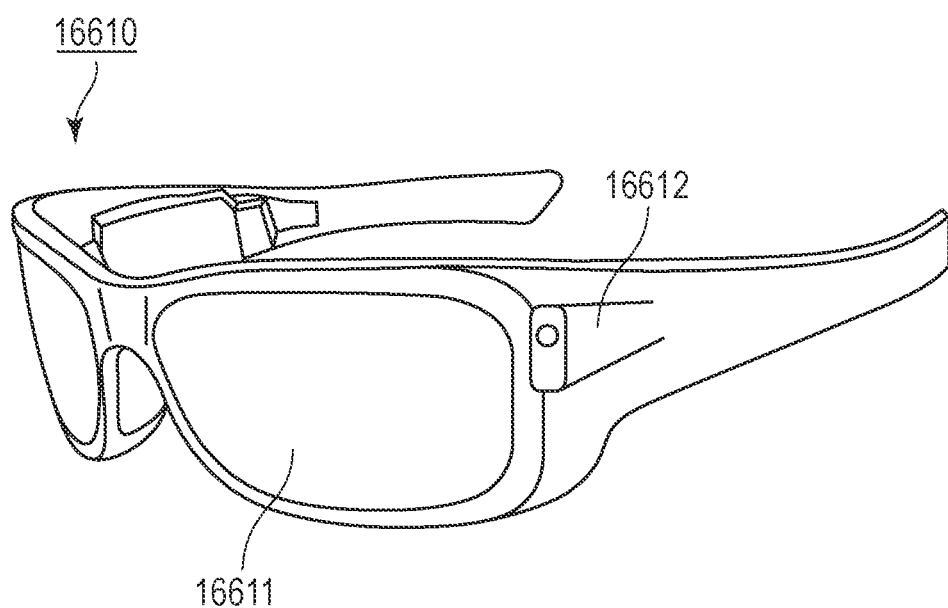

FIGS. 12A and 12B each illustrate, as one of examples of applications, eyeglasses 16600 (smart glasses). The eyeglasses 16600 have a photoelectric conversion apparatus 16602. The photoelectric conversion apparatus 16602 may be a photoelectric conversion apparatus according to one of the embodiments described above. A display apparatus including a light emitting device such as an OLED or an LED may be provided on a back surface side of a lens 16601. One or more photoelectric conversion apparatuses 16602 may be provided. When a plurality of photoelectric conversion apparatuses are used, types thereof may be the same or different. The positions where the photoelectric conversion apparatuses 16602 are disposed is not limited to those shown in FIG. 9A.

The eyeglasses 16600 further include a control apparatus 16603. The control apparatus 16603 functions as a power source for supplying power to the photoelectric conversion apparatus 16602 and to the display apparatus described above. The control apparatus 16603 controls the operations of the photoelectric conversion apparatus 16602 and the display apparatus. The lens 16601 has an optical system for condensing light on the photoelectric conversion apparatus 16602.

FIG. 12B illustrates another example of eyeglasses 16610 (smart glasses).

The eyeglasses 16610 has a control apparatus 16612, wherein the control apparatus 16612 includes a display apparatus and a photoelectric conversion apparatus corresponding to the photoelectric conversion apparatus 16602. The lens 16611 has an optical system to project light generated by the display apparatus and the photoelectric conversion apparatus in the control apparatus 16612 thereby projecting an image on the lens 16611. The control apparatus 16612 functions as the power source for supplying electric power to the photoelectric conversion apparatus and the display apparatus, and functions to control the operations of the photoelectric conversion apparatus and the display apparatus. The control apparatus may include a line-of-sight detection unit that detects a line of sight of a user who wears the eyeglasses 16610. Infrared light may be used to detect the line of sight. An infrared light emitting unit emits infrared light toward an eyeball of the user who is gazing at the displayed image. An image of the eyeball can be obtained by detecting reflected light of the emitted infrared light from the eyeball by an imaging unit having a light receiving element. By providing a reducing unit for reducing light from the infrared light emitting unit to the display unit as seen in a plan view, the degradation in the image quality is reduced.

The user's line of sight to the displayed image is detected from the image of the eyeball captured using the infrared light. An arbitrary known method can be used in the line-of-sight detection using the captured image of the eyeball. For example, a line-of-sight detection method based on a Purkinje image using reflection of irradiation light on a cornea can be used.

More specifically, the line-of-sight detection process is performed based on a pupillary conical reflex method. The line of sight of the user is detected by calculating a line-of-sight vector representing a direction (a rotation angle) of the eyeball based on the image of the pupil and the Purkinje image included in the captured image of the eyeball using the pupillary corneal reflex method.

The display apparatus according to the present embodiment may include a photoelectric conversion apparatus having a light receiving element, and may control the image displayed on the display apparatus based on the user's line-of-sight information provided from the photoelectric conversion apparatus.

More specifically, the display apparatus determines a first field-of-view area being watched by the user and a second field-of-view area other than the first field-of-view area based on the line-of-sight information. The first field-of-view area and the second field-of-view area may be determined by the control apparatus of the display apparatus, or may receive information indicating the first field-of-view area and the second field-of-view area determined by an external control apparatus. In the display area of the display apparatus, the display resolution of the first field-of-view area may be controlled to be higher than the display resolution of the second field-of-view area. That is, the resolution of the second field-of-view area may be lower than that of the first field-of-view area.

The display area may include a first display area and a second display area different from the first display area. The priorities for the first display area and the second display area may be determined based on the line-of-sight information. The first field-of-view area and the second field-of-view area may be determined by the control apparatus of the display apparatus, or may receive information indicating the first field-of-view area and the second field-of-view area determined by an external control apparatus. The resolution of the higher-priority area may be controlled to be higher than the resolution of the other area. That is, the resolution of the area having a relatively low priority may be controlled to be low.

Note that the determination of the first field-of-view area and the determination of the higher-priority area may be performed using AI. The AI may be based on a model of estimating, from an image of an eyeball, the angle of the line of sight and the distance to a target object ahead of the line of sight, wherein the model is built by learning training data as to images of eyeballs and viewing directions of the eyeballs of the image. The AI program may be possessed by the display apparatus, the photoelectric conversion apparatus, or the external apparatus. In a case where the AI program is possessed by the external apparatus, it is transferred to the display apparatus via communication.

In a case where the displaying is controlled based on the visual detection, it is possible to preferably apply the technique to smart glasses further including a photoelectric conversion apparatus for capturing an image of the outside. Smart glasses can display captured external information in real time.

Tenth Embodiment

A system according to a tenth embodiment is described below with reference to FIG. 13. The system according to this twelfth embodiment can be applied to a pathological diagnosis system used by a doctor or the like to observe cells or tissues collected from a patient to diagnose a lesion, or to a diagnosis support system for supporting pathological diagnosis. The system according to the present embodiment may diagnose a lesion or assist the diagnosis based on an acquired image.

Figure 13:
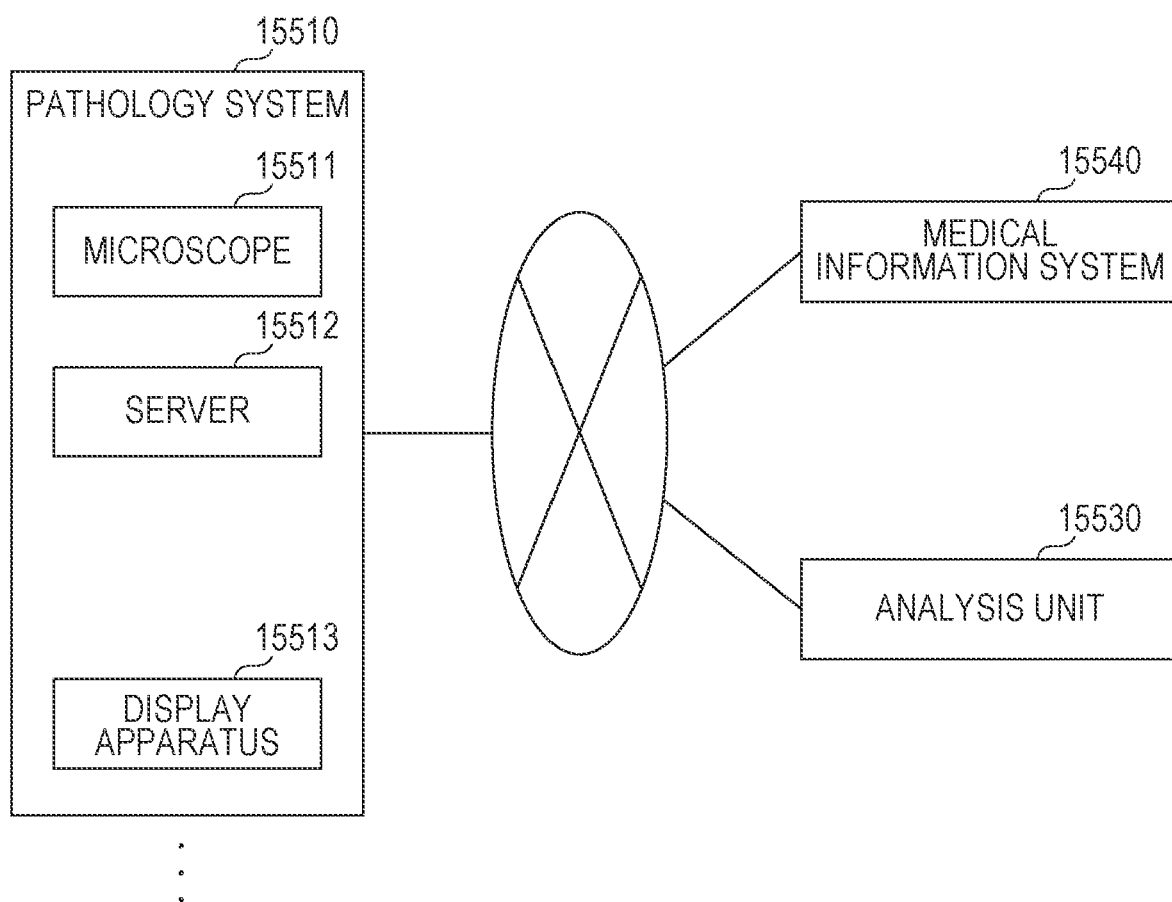
FIG. 13 is a schematic view of a pathological diagnosis system according to a tenth embodiment.

As shown in FIG. 13, the system according to the present embodiment includes one or more pathology systems 15510. The system may further include an analysis unit 15530 and a medical information system 15540.

Each of one or more pathology systems 15510 is a system mainly used by a pathologist and is installed, for example, in a laboratory or a hospital. The pathology systems 15510 may be installed in different hospitals, and they are connected to the analysis unit 15530 and the medical information system 15540 via various networks such as a wide area network, a local area network, etc.

Each pathology system 15510 includes a microscope 15511, a server 15512, and a display apparatus 15513.

The microscope 15511 has a function of an optical microscope, and is used to capture an image of an observation target object placed on a glass slide thereby acquiring a pathological image in the form of a digital image. The observation target object is, for example, a tissue or a cell collected from a patient. More specifically, for example, the observation target object may be a piece of meat of an organ, saliva, blood, or the like.

The server 15512 stores the pathological image acquired by the microscope 15511 in a storage unit (not shown). When the server 15512 receives a browsing request, the server 15512 may search for a pathological image stored in the storage unit (a memory or the like) and may display the retrieved pathological image on the display apparatus 15513. The server 15512 and the display apparatus 15513 may be connected via an apparatus that controls displaying.

In a case where an observation target object is a solid substance such as a piece of meat of an organ, the observation target object may be given, for example, in the form of a stained thin section. The thin section may be prepared, for example, by slicing a block piece cut out from a sample such as an organ into the thin section. When slicing is performed, the block piece may be fixed with paraffin or the like.

The microscope 15511 may include a low-resolution imaging unit for acquiring a low-resolution image and a high-resolution imaging unit for acquiring a high-resolution image. The low-resolution imaging unit and the high-resolution imaging unit may have different optical systems or may share the same optical system. When the same optical system is used, the resolution of the microscope 15511 may be changed depending on the imaging target object.

The observation target object is disposed in a glass slide or the like and placed on a stage located within the angle of view of the microscope 15511. The microscope 15511 first acquires an overall image within the angle of view using the low-resolution imaging unit, and identifies a particular area of the observation target object from the acquired overall image. Subsequently, the microscope 15511 divides the area where the observation target object exists into a plurality of divided areas each having a predetermined size, and sequentially captures images of the respective divided areas by the high-resolution imaging unit thereby acquiring high-resolution images of the respective divided areas. Switching of the divided area to be imaged may be realized by moving the stage or the imaging optical system or both the stage and the imaging optical system. Switching between divided areas may be performed such that there is an overlap between adjacent divided areas in order to prevent an occurrence of missing some part of a divided area due to unintended sliding of the glass slide. The overall image may include identification information for associating the overall image with the patient. This identification information may be given by, for example, a character string, a QR code (registered trademark), or the like.

The high-resolution image acquired by the microscope 15511 is input to the server 15512. The server 15512 may divide each high-resolution image into smaller-size partial images. When the partial images are generated in the manner described above, the server 15512 executes a composition process for generating one image by combining a predetermined number of adjacent partial images into a single image. This compositing process can be repeated until one final partial image is produced. By performing this processing, it is possible to obtain a group of partial images in a pyramid structure in which each layer is composed of one or more partial images. In this pyramid structure, a partial image of a layer has the same number of pixels as the number of pixels of a partial image of another different layer, but the resolution is different between layers. For example, when a total of 2×2 partial images are combined to generate one partial image in an upper layer, the resolution of the partial image in the upper layer is ½ times the resolution of the partial images in a lower layer used for the composition.

By constructing a partial image group in the pyramid structure, it is possible to switch the detail level of the observation target object displayed on the display apparatus depending on the layer to which the displayed tile images belong. For example, when a lowest-level partial image is used, a small area of the observation target object is displayed in detail, while when a higher-level partial image is used, a larger area of the observation target object is displayed in a coarse manner.

The generated partial image group in the pyramid structure can be stored in, for example, a memory. When the server 15512 receives a request for acquiring a partial image together with identification information from another apparatus device (for example, the analysis unit 15530), the server 15512 transmits the partial image corresponding to the identification information to this apparatus.

A partial image of a pathological image may be generated for each imaging condition such as a focal length, a staining condition, or the like. In a case where a partial image is generated for each imaging condition, partial images may be displayed such that, in addition to a specific pathological image, other pathological images which correspond to imaging conditions different from the imaging condition of the specific pathological image but correspond to the same region as that of the specific pathological image are displayed side by side. The specific imaging condition may be specified by a viewer. In a case where a plurality of imaging conditions are specified by the viewer, pathological images of the same area satisfying the respective imaging conditions may be displayed side by side.

The server 15512 may store a partial image group in the pyramid structure in a storage apparatus other than the server 15512, for example, a cloud server. Part or all of the partial image generation process described above may be executed by a cloud server or the like. By using partial images in the manner described above, a user can observe an observation target object as if the user is actually observing the observation target object while changing the observation magnification. That is, controlling the displaying provides a function of a virtual microscope. The virtual observation magnification actually corresponds to the resolution.

The medical information system 15540 is a so-called electronic medical record system. In this medical information system 15540, information is stored related to diagnosis such as patient identification information, patient disease information, test information and image information used in diagnosis, a diagnosis result, and a prescription. For example, a pathological image obtained by imaging an observation target object of a patient may be stored once in the server 15512 and may be displayed on the display apparatus 15514 later. A pathologist using the pathology system 15510 performs a pathological diagnosis based on the pathological image displayed on the display apparatus 15513. The result of the pathological diagnosis made by the pathologist is stored in the medical information system 15540.

The analysis unit 15530 is capable of analyzing the pathological image. A learning model built by machine learning may be used for the analysis. The analysis unit 15530 may derive a result of classification of a specific area, a result of an tissue identification, or the like as the analysis result. The analysis unit 15530 may further derive a result of cell identification, the number of cells, the position of cell, and luminance information, and scoring information for them. These pieces of information obtained by the analysis unit 15530 may be displayed as diagnostic support information on the display apparatus 15513 of the pathology system 15510.

The analysis unit 15530 may be realized by a server system including one or more servers (including a cloud server) and/or the like. The analysis unit 15530 may be incorporated in, for example, the server 15512 in the pathology system 15510. That is, various analysis on the pathological image may be performed within the pathology system 15510.

The photoelectric conversion apparatus according to one of the embodiments may be applied suitably to, for example, the microscope 15511 among the various units. More specifically, the photoelectric conversion apparatus may be applied to the low-resolution imaging unit and/or the high-resolution imaging unit in the microscope 15511. This makes it possible to reduce the size of the low-resolution imaging unit and/or the high-resolution imaging unit, and, as a result, it becomes possible to reduce the size of the microscope 15511. As a result, it becomes easy to transport the microscope 15511, and thus it becomes easy to build the system or modify the system. Furthermore, by using the photoelectric conversion apparatus according to one of the embodiments described above, it becomes possible that part or all of the processes including acquiring an pathological image and other processes until analysis of the pathological image is completed can be executed on the fly by the microscope 15511, and thus it becomes possible to output accurate diagnostic support information quickly.

The techniques described above can be applied not only to the diagnosis support system but can be general applied to biological microscopes such as a confocal microscope, a fluorescence microscope, and a video microscope. The observation target object may be a biological sample such as cultured cells, a fertilized egg, or a sperm, a biomaterial such as a cell sheet or a three-dimensional cell tissue, or a living body such as a zebrafish or a mouse. In the observation, the observation target object is not limited to being placed on a glass slide, but can be stored in a well plate, a petri dish, or the like.

A moving image may be generated from still images of an observation target object acquired using a microscope. For example, a moving image may be generated from still images successively captured in a particular period, or an image sequence may be generated from still images captured at a particular interval. By generating a moving image from still images, it becomes possible to analyze, using machine learning, dynamic features of the observation target object such as beating or elongating of cancer cells, nerve cells, a myocardial tissue, a sperm, etc, movement such as migration, a division process of cultured cells or fertilized eggs, etc.

OTHER EMBODIMENTS

The present disclosure has been described above with reference to various embodiments. However, the present disclosure is not limited to these embodiments, and various modifications and changes can possible. The embodiments may be mutually applicable. That is, a part of one embodiment may be replaced with a part of another embodiment, or a part of one embodiment may be added to another embodiment. Part of an embodiment may be deleted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016455 filed Feb. 4, 2021, which is hereby incorporated by reference herein in its entirety.

What is claimed is:

1. A photoelectric conversion apparatus comprising:
a first substrate including a pixel array including a plurality of pixels; and
a second substrate disposed in a multilayer structure on the first substrate,
the photoelectric conversion apparatus further comprising:
one or more memories storing instructions; and
one or more processors which executes the stored instructions causing the photoelectric conversion apparatus to function as:
a machine learning unit configured to execute processing using machine learning on a signal output from the pixel array; and
a first signal output unit configured to output a signal corresponding to temperature and a second signal output unit disposed on the second substrate,
the second substrate has a first region in which the first signal output unit is disposed and a second region in which the second signal output unit is disposed,
both the machine learning unit and the first signal output unit being disposed on the second substrate.

2. The photoelectric conversion apparatus according to claim 1, wherein an output provided by the signal output unit is used as a variable in a process performed by the machine learning unit using the machine learning.

3. The photoelectric conversion apparatus according to claim 1, further comprising an output unit,
wherein in a case where a signal based on the output provided by the signal output unit is greater than a value corresponding to a particular temperature, the output unit outputs warning information to outside of the photoelectric conversion apparatus.

4. The photoelectric conversion apparatus according to claim 1, wherein in a case where a signal based on the output provided by the signal output unit is greater than a value corresponding to a particular temperature, operation of the machine learning unit is stopped.

5. The photoelectric conversion apparatus according to claim 1, further comprising an additional signal output unit configured to output a signal corresponding to temperature, wherein the additional signal output unit is disposed on the first substrate.

6. The photoelectric conversion apparatus according to claim 1, further comprising a plurality of signal output units disposed on the second substrate, and no element is disposed in a shortest path between at least two of the plurality of signal output units.

7. The photoelectric conversion apparatus according to claim 1, further comprising a plurality of signal output units disposed on the second substrate such that at least two of the signal output units in the plurality of output units are disposed with a distance from each other is equal to or small than 200 µm.

8. The photoelectric conversion apparatus according to claim 6, wherein the plurality of signal output units are disposed such that no other element exists in a shortest path between each of the plurality of signal output units and the machine learning unit.

9. The photoelectric conversion apparatus according to claim 4, wherein reading paths of the respective signal output units do not have a shared node.

10. The photoelectric conversion apparatus according to claim 1, 
wherein each unit area of the first region having a number of elements smaller than a number of elements per unit area in the second region.

11. The photoelectric conversion apparatus according to claim 1,
wherein power consumption per unit area in the first region is smaller than power consumption per unit area in the second region.

12. The photoelectric conversion apparatus according to claim 5, wherein
the first substrate and the second substrate are connected to each other by connection parts defining a connection plane,
each connection part providing a connection such that an insulator of the first substrate and an insulator of the second substrate are connected to each other at the connection plane, and a metal of the first substrate and a metal of the second substrate are connected to each other at the connection plane.

13. The photoelectric conversion apparatus according to claim 12, wherein the signal output from the signal output unit disposed on the first substrate is input via one of the connection parts to the machine learning unit disposed on the second substrate.

14. The photoelectric conversion apparatus according to claim 4, wherein the machine learning unit corrects image data based on a trained model using temperature distribution information related to the photoelectric conversion apparatus obtained from the signal output unit.

15. The photoelectric conversion apparatus according to claim 14, wherein the trained model uses temperature distribution information indicating a temperature distribution of the second substrate.

16. The photoelectric conversion apparatus according to claim 14, wherein the trained model uses temperature distribution information indicating a temperature distribution between the first substrate and the second substrate.

17. A photoelectric conversion comprising:
the photoelectric conversion apparatus according to claim 1; and
a signal processing unit configured to generate an image using a signal output by the photoelectric conversion apparatus.

18. A mobile body comprising:
the photoelectric conversion apparatus according to claim 1; and
a control unit that controls the movement of the moving body using a signal output by the photoelectric conversion apparatus.

19. A semiconductor substrate disposed in a multilayer structure on another semiconductor substrate having a pixel array including a plurality of pixels, the semiconductor substrate comprising:
a machine learning unit configured to execute processing using machine learning on a signal output from the pixel array; and
a first signal output unit configured to output a signal corresponding to temperature and a second signal output unit disposed on the another semiconductor substrate,
the another semiconductor substrate has a first region in which the first signal output unit is disposed and a second region in which the second signal output unit is disposed,
both the machine learning unit and the first signal output unit being disposed on the another semiconductor.

20. A semiconductor substrate disposed in a multilayer structure on a semiconductor substrate having a pixel array including a plurality of pixels and a first signal output unit configured to output a signal corresponding to temperature, the semiconductor substrate comprising:
a machine learning unit configured to execute processing using machine learning on a signal output from the pixel array; and
a second signal output unit disposed on the semiconductor substrate,
the semiconductor substrate has a first region in which the first signal output unit is disposed and a second region in which the second signal output unit is disposed,
both the machine learning unit and the first signal output unit being disposed on the semiconductor substrate.

* * * * *